US009112336B2

(12) United States Patent
Samuelson

(10) Patent No.: US 9,112,336 B2
(45) Date of Patent: Aug. 18, 2015

(54) INSERT-MOLDED ASSEMBLY FOR LOAD CENTER ELECTRICAL DISTRIBUTION BUS

(71) Applicant: Eaton Corporation, Cleveland, OH (US)

(72) Inventor: Eric Alan Samuelson, Springfield, IL (US)

(73) Assignee: EATON CORPORATION, Cleveland, OH (US)

(*) Notice: Subject to any disclaimer, the term of this patent is extended or adjusted under 35 U.S.C. 154(b) by 304 days.

(21) Appl. No.: 13/756,279

(22) Filed: Jan. 31, 2013

(65) Prior Publication Data
US 2014/0185195 A1 Jul. 3, 2014

Related U.S. Application Data

(60) Provisional application No. 61/748,013, filed on Dec. 31, 2012.

(51) Int. Cl.
*H02B 1/20* (2006.01)
*H02B 1/056* (2006.01)

(52) U.S. Cl.
CPC ............ *H02B 1/056* (2013.01); *H02B 1/205* (2013.01); *Y10T 29/49117* (2015.01)

(58) Field of Classification Search
CPC .......... H02B 1/056; H02B 1/205; H02B 1/20; Y10T 29/49117; H05K 13/04
USPC ..................... 361/600–678; 29/825
See application file for complete search history.

(56) References Cited

U.S. PATENT DOCUMENTS

| 4,895,255 | A | 1/1990 | Fisher | |
|---|---|---|---|---|
| 5,072,071 | A * | 12/1991 | Cassity et al. | 174/660 |
| 5,924,266 | A | 7/1999 | Salvador | |
| 5,960,958 | A | 10/1999 | Michaud et al. | |
| 5,967,329 | A | 10/1999 | Salvador | |
| 2008/0190802 | A1 | 8/2008 | Chiu | |
| 2012/0099279 | A1 * | 4/2012 | Greenwood et al. | 361/704 |

OTHER PUBLICATIONS

Microplastics website: http://www.microplasticsinc.com/what_is_insert_molding.php.*

* cited by examiner

*Primary Examiner* — Anthony Haughton
*Assistant Examiner* — Yahya Ahmad
(74) *Attorney, Agent, or Firm* — Eckert Seamans Cherin & Mellott, LLC; Kirk D. Houser; Grant E. Coffield

(57) ABSTRACT

An insert-molded bus assembly for an electrical distribution load center interior is described. The apparatus of the present teachings comprises at least one bus element insert-molded into an insulation element of the distribution load center creating an amalgamated insert-molded bus assembly. The amalgamated insert-molded bus assembly may also include a molded backpan, or may be detachably or permanently fastened to a separate backpan of the distribution load center interior.

18 Claims, 5 Drawing Sheets

INSERT-MOLDED ASSEMBLY FOR LOAD CENTER ELECTRICAL DISTRIBUTION BUS

CLAIM OF PRIORITY TO PROVISIONAL APPLICATION

Incorporation by Reference

This application claims priority under 35 USC 119 to U.S. Provisional Application No. 61/748,013, filed Dec. 31, 2012 entitled "INSERT-MOLDED ASSEMBLY FOR LOAD CENTER ELECTRICAL DISTRIBUTION BUS"; the contents of Provisional Application No. 61/748,013 filed Dec. 31, 2012 is hereby incorporated herein by reference as if set forth in full.

FIELD

The present disclosure relates generally to electrical distribution load centers. More specifically, the present disclosure relates to the specific application, assembly, arrangement and electrical insulation of load center electrical distribution bus assemblies and related bus assembly components.

BACKGROUND

Electrical busses used in electrical load centers are well known. Electrical busses comprise conductors permitting electrical current to be carried throughout an electrical load center. Electrical busses may contain features permitting attachment of fuses, relays, switches, wires, breakers, and other electrical elements. One type of electrical bus is typically referred to as a "bus bar" which usually serves as a common connection for two or more circuits in a load center. Bus bars usually comprise aluminum or copper; although other convenient conducting materials may also be used.

The application of insulating material in electrical load centers is well known. Load centers may contain one or more electrical busses in close proximity to one another, necessitating use of insulating material or insulation so as to avoid an arcing or shorting event occurring between the busses. Busses must be electrically insulated from each other to avoid a phase-to-phase short circuit. Busses must also be electrically insulated from the electrical load center enclosure to avoid a phase-to-ground short circuit. Some load centers also require that branch circuit breakers be connected to the electrical busses at specific points within the load centers. The shape of the insulating material and the features contained therein permit specific placement of the branch circuit breakers. Typically, insulation in a load center is achieved within a load center using non-conducting materials and using individual branch circuit breaker insulators placed on, between, or among the bus elements.

Injection molding technology has been used to create insulating materials. Injection molding typically comprises injecting heated thermoplastics into a non-plastic mold cavity. As the thermoplastic material cools within the mold cavity, an insulation element hardens into the shape defined by the mold cavity. The injection-molded insulating element is then installed as a separate piece on or among the bus elements within the electrical load center.

A common practice in manufacturing and in assembly of the interior components in prior art load centers is to separately manufacture the "backpan" structure, bus bars, and insulating elements and require a user to manually assemble the interior components of the load center at the time of installation. Specialized skill and knowledge is required by a technician in order to assemble the conventional prior art load centers. The location, orientation, and spacing of the bus elements and insulation elements within the load center must be precisely arranged so as to prevent an arcing, overcurrent, or short circuit event once the busses are placed under load. Consequences of electrical arcing, overcurrent, or short circuits include, without limitation, the destruction of electrical connectors, damage to downline appliances, and even fire. The installation of a conventional load center requires hand assembly and specialized skill to install separate electrical bus bars and insulation elements. Consequently, installation of a conventional load center can be expensive and time intensive.

While load center, electrical bus, and insulation technology are well known, innovations are evolving rapidly. As with many electrical components and technologies, a constant need exists in the art for a simplified method of manufacture and a simplified structure permitting for easier, time saving, and less expensive assembly and easier access to and use by consumers. The need also exists for an apparatus or bus assembly requiring fewer parts during the assembly and installation of interior components of electrical load centers. More specifically, insert-molding technology is needed thereby providing insulating elements in electrical bus bars and/or backpans while also providing electrical isolation between bus bars.

Consequently, the present disclosure provides a means, method, apparatus, and device that simplifies manufacture, assembly, installation, and use of electrical load centers comprising electrical bus elements and insert-molded insulating elements.

SUMMARY

The present disclosure provides a device for the improved manufacture, assembly, arrangement, installation, and use of electrical load centers. The present disclosure also provides a method for the improved manufacture, assembly, arrangement, installation, and use of electrical load centers. Typical load centers have suffered from the limitation of requiring time intensive hand assembly in order for a technician or a user to ensure that electrically insulating elements are properly positioned within conductive bus elements to prevent arcing or short-circuiting from occurring. Prior art load centers have also suffered from the limitation that technicians with specialized skill or training are required to assemble and install the various insulating and conductive bus elements in the load center. The load center disclosed herein instead employs insert-molding technology to anchor electrical bus elements within the molded insulation element of a load center. As compared to injection molding, insert-molding technology incorporates the non-molded elements into the manufacturing process. In accordance with one aspect of the present disclosure, the non-molded elements are positioned in the molding cavity, and then heated thermoplastic material is injected into the molding cavity. As the thermoplastic material cools, the thermoplastic insulation hardens around the non-molded bus elements in-situ. The use of insert-molding technology permits precise positioning of the bus elements relative to each other within the molded insulating element. The use of insert-molding also permits precise application of insulating material within the bus elements.

In stark contrast to the prior art techniques that require use and assembly of separate bus and insulating elements, once the insert-molding process takes place, a technician need only install one amalgamated piece of hardware into the load center. Instead of requiring the user to carefully measure and place multiple bus bars and electrically insulating elements in a load center, once insert-molded, a single amalgamated piece of hardware is pre-manufactured with proper insulation, spacing, and bus arrangement incorporated into the mold. The insert-molded insulating element thereby becomes a bus assembly chassis.

According to an exemplary embodiment of the present disclosure, a load center interior is provided. In one embodiment, the load center interior comprises a backpan, one or more electrical bus bars and at least one electrical insulation element between or among said bus bars, said bus bars being insert-molded precisely into position within said insulation element. In one embodiment, the insert-molded insulation element and bus bars form an amalgamated bus assembly. In one embodiment, said bus assembly is detachably or permanently fastened to a backpan.

According to another exemplary embodiment, an improved system for preventing load center arcing and short-circuiting is provided. In one embodiment, the load center interior comprises a backpan, one or more electrical bus bars and at least one insulating element positioned between or among said bus bars, said bus bars insert-molded into a desired position within said insulating element. In one embodiment, the insert-molded insulating element and bus bars form an amalgamated bus assembly. In one embodiment, said bus assembly is detachably or permanently fastened to the backpan.

According to another exemplary embodiment, a system for an improved arrangement and installation of load center interiors is provided. In one embodiment, the load center interior comprises a backpan, one or more electrical bus bars and at least one insulating element positioned between or among said bus bars, said bus bars insert-molded into a desired position within said insulating element. In one embodiment, the insert-molded insulating element and bus bars form an amalgamated bus assembly. In one embodiment, said bus assembly is detachably or permanently fastened to a load center backpan.

According to another exemplary embodiment, a method of manufacturing a bus assembly for improved load center arrangement and installation is provided. In one embodiment, the method of manufacture comprises a step of creating an electrical load center insulation mold; a step of creating one or more electrical bus bars; a step of inserting said bus bars into position within said insulation mold; a step of liquefying thermoplastic insulating material; a step of injecting the liquefied thermoplastic insulating material into the mold; a step of cooling the thermoplastic insulating material into a hardened shape bounded by said mold; a step of removing the amalgamated insert-molded bus assembly; and a step of detachably or permanently fastening the amalgamated insert-molded bus assembly onto an electrical load center backpan.

According to another exemplary embodiment, a method of manufacturing an electrical load center device to prevent load center arcing and short-circuiting is provided. In one embodiment, the method of manufacture comprises a step of creating an electrical load center insulation mold; a step of creating one or more electrical bus bars; a step of inserting said bus bars into position within said insulation mold; a step of liquefying thermoplastic insulating material; a step of injecting the liquefied thermoplastic insulating material into the mold; a step of cooling the thermoplastic insulating material into a hardened shape bounded by said mold; a step of removing the amalgamated insert-molded bus assembly; and a step of detachably or permanently fastening the amalgamated insert-molded bus assembly onto a load center backpan.

Further embodiments of the disclosure are shown in the specification, drawings and claims of the present application.

DETAILED DESCRIPTION

In the present disclosure, a "load center" or "electrical distribution load center" is defined herein as the collective components of an electrical distribution system and its respective housing that supplies electrical power to one or more subsidiary circuits. A "load center interior" refers to the components used within a load center and does not include the exterior housing. In the present disclosure, a "bus," "bus element," "electrical distribution bus," or "bus bar" is any component in an electrical distribution system that conducts electricity within the load center. In the present disclosure, the terms "insulation" and "insulating element" comprise any component or element in a load center that does not conduct electricity within the electrical supply system.

The disclosed teachings provide advantageous devices, systems, and methods of manufacture, assembly, arrangement, installation, and use of electrical load centers. The insert-molded assembly for load centers described herein additionally provides protection against arcing, overcurrent, and short-circuiting as required by typical load centers. Using the devices, system, and methods according to the present teachings, insert-molding technology is applied to implement insulation element material used in conjunction with precise arrangement and spacing of bus bar elements to create an amalgamated bus assembly which may be secured to a backpan within a load center interior.

Figure 1:
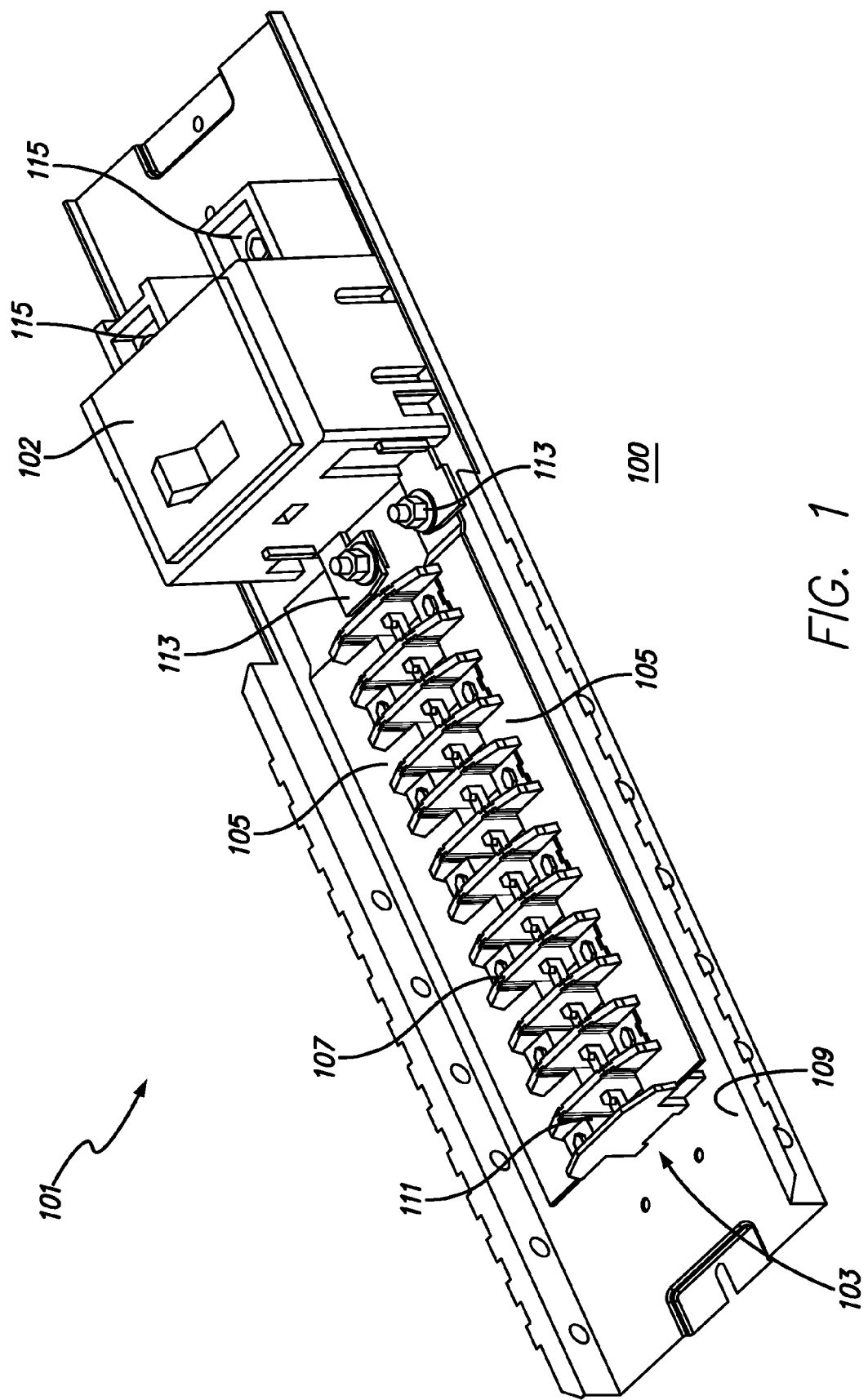
FIG. 1 is a three-dimensional isometric view of an exemplary embodiment of an electrical distribution load center made in accordance with the present teachings, specifically including a load center interior containing an amalgamated bus assembly with bus bars insert-molded into circuit separation insulation which is secured to a backpan.

Referring now to FIG. 1, FIG. 1 is a three-dimensional isometric view of an exemplary embodiment of an electrical distribution center made in accordance with the present teachings. As shown in FIG. 1, the load center (100) includes a load center interior (101). The load center interior (101) further includes a backpan (109), a main breaker (102) and an insert-molded bus assembly (103). Said bus assembly (103) comprises of one or more bus bars (105) that are insert-molded into an insulation element (107). The bus assembly (103) is either detachably or permanently fastened to the backpan (109). The bus assembly (103) may also be connected to the main breaker (102) through mounting hardware (113). The main breaker (102) may be connected to an external power supply via main lugs (115).

Referring again to FIG. 1, the bus bars (105) may have substantially flat portions that extend longitudinally within, and lie in a plane parallel to a trough formed by the backpan (109). The bus bars (105) may contain bus bar stabs, otherwise known as branch circuit breaker stabs (not visible), that are exposed within the insulation element (107) so as to conduct electricity to branch circuit breakers, when connected. Bus bar stabs generally protrude in a direction away from the bus bar (105) and in a direction inward toward a midline of the insulation element (107). The bus bar stabs may also extend upwardly to contact a branch circuit breaker when connected.

The bus bar (105) is designed to electrically couple to the main breaker (102) via the mounting hardware (113) as well any branch circuit breakers that may be coupled thereto (not pictured). The bus bars (105) however, remain electrically insulated from other electrically conducting elements thus avoiding the occurrence of a shorting event. In accordance with the presently disclosed apparatus and method, a thin layer of insulation may be molded onto the substantially flat surfaces of the bus bars (105) during the insert-molding process to electrically insulate the bus bars (105) from other conducting elements, such as a backpan (109), if said backpan (109) is made of a conductive material such as metal. Alternatively, the bus bars (105) may maintain electrical insulation from other conducting elements by means of physical separation from the other conducting elements. Maintaining electrical insulation of the bus bars (105) via physical separation may be achieved by ensuring the insulation element (107) interfacing with the backpan (109) provides sufficient spacing to maintain sufficient distance between the backpan (109) and the bus bars (105). If the backpan (109) comprises insulating material such as plastic, the bus bars (105) do not need to be physically separated from the backpan (109).

Referring again to FIG. 1, the backpan (109) may comprise either conducting or insulating (i.e., non-conducting) material. If the backpan (109) comprises conducting material, the insert-molded bus assembly (103) may be detachably fastened to the backpan (109) via securing clips, snaps, or other methods (not pictured). If the insert-molded bus assembly (103) is permanently fastened to the backpan (109), the insert-molded bus assembly (103) may include one or more plastic anchor elements (not pictured) that protrude downwardly through openings in the backpan (not shown). If heated, these anchor elements may weld the bus assembly (103) to the backpan (109). The backpan (109) may, in some embodiments, comprise insulating material, in which case the backpan (109) may be included as a component of the insert-molded bus assembly (103). In these embodiments, the insert-molded bus assembly (103) may comprise the bus bars (105), the insulation element (107), and the backpan (109).

Referring again to FIG. 1, in one embodiment, the bus assembly (103) comprises the bus bars (105) that can be insert-molded into the branch breaker insulation element (107). In another embodiment wherein the backpan (109) comprises insulating material, the bus assembly (103) comprises the bus bars (105) insert-molded into both the branch breaker insulation element (107) and the backpan (109). The insulation element (107) may include one or more branch breaker compartments (106) adapted to be electrically and physically coupled to one or more branch circuit breakers.

Each branch breaker compartment (106) may be defined by substantially parallel walls lying in a plane extending perpendicularly from the bus bars (105). Within each branch breaker compartment (106) the insulation element (107) may include an insulation stab (111), which provides support to prevent physical deflection of the bus bar stab (not visible) when a branch circuit breaker is coupled to bus bar stab. If the bus assembly (103) calls for multiple branch breaker compartments (106), insert-molding technology permits for adjacent branch breaker compartments to share common walls.

In one embodiment, the insert-molded bus assembly (103) is created by first selecting a mold cavity that defines a desired shape of the molded insulation (107) and backpan (109). The bus bars (105) are placed in the mold cavity according to an applicable manufacturing or product specification. Liquefied thermoplastic material is then injected into the mold cavity. The thermoplastic is permitted to cool and harden. Once cooled, the insulation material hardens around the bus bars (105) to fuse their position in place.

Figure 2:
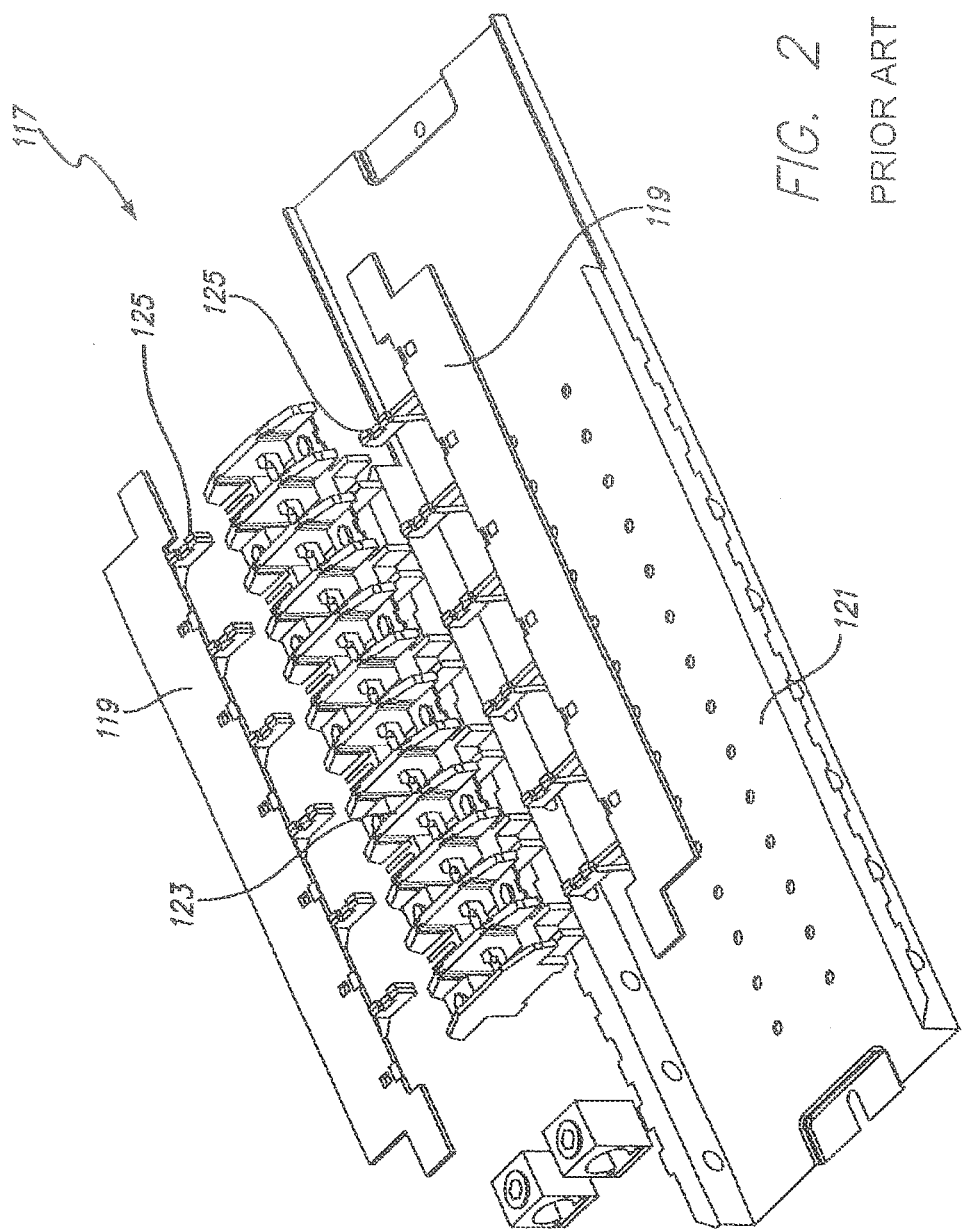
FIG. 2 is a three-dimensional isometric exploded view of a prior art load center interior containing a multi-piece bus assembly that does not use the presently disclosed insert-molding technology. This multi-piece bus assembly uses separate bus bars and several individual circuit separating insulators. The assembly, as shown, is not secured to the backpan.

Referring now to figure FIG. 2, a prior art load center interior (117) is shown in exploded view. This prior art load center interior (117) may contain multiple bus bars (119) that must be manually positioned and secured to a backpan (121). The prior art load center interior (117) may use individual branch insulators (123), which may be arranged side by side and may be removably attached to the bus bars (119). In the prior art load center interior (117), the bus bar stabs (125) are easily identified when the individual branch insulators (123) are not attached.

Figure 3:
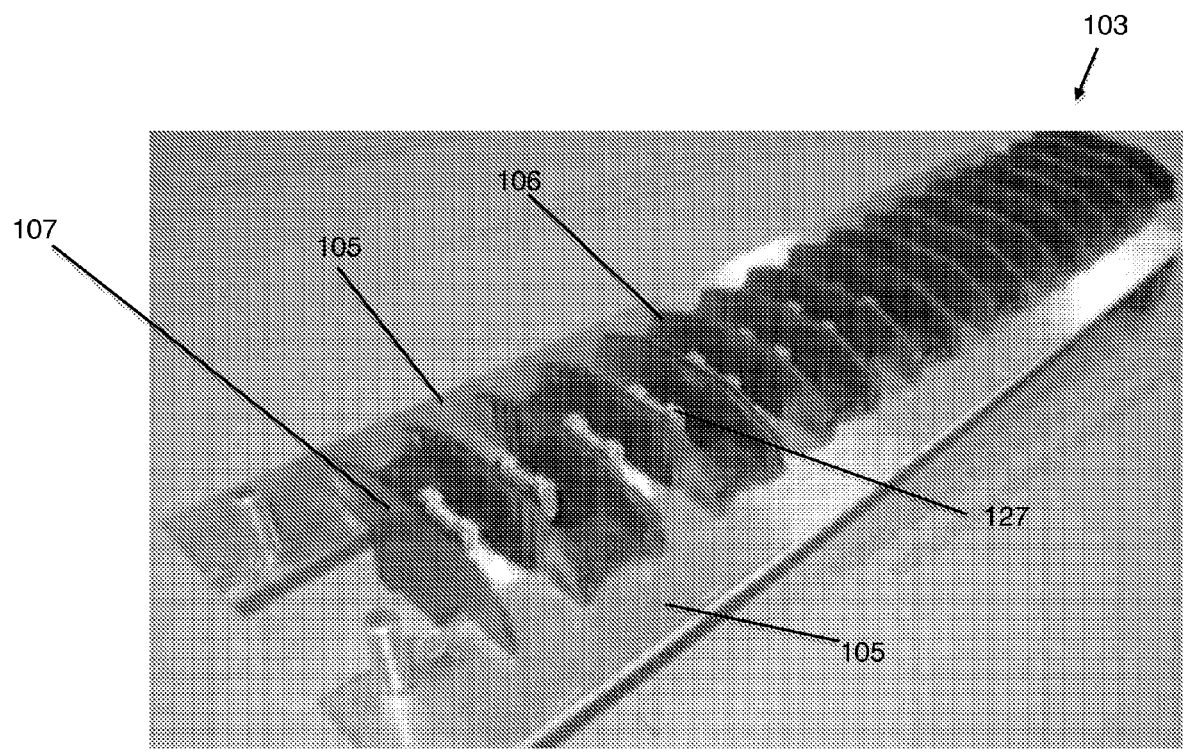
FIG. 3 is a three-dimensional view of an exemplary embodiment of an insert-molded bus assembly made in accordance with the present disclosure, specifically an insert-molded bus assembly having bus bars insert-molded into an insulating element.

Referring now to FIG. 3, an insert-molded bus assembly (103) made in accordance with the present disclosure is shown. The bus assembly (103) includes bus bars (105) that are insert-molded into a branch breaker insulation element (107). The bus bar stabs (127) are visible in each branch breaker compartment (106) of the insert-molded insulation element (107). The bus bar stabs (127) are adapted to receive a branch circuit breaker (not shown).

Figure 4:
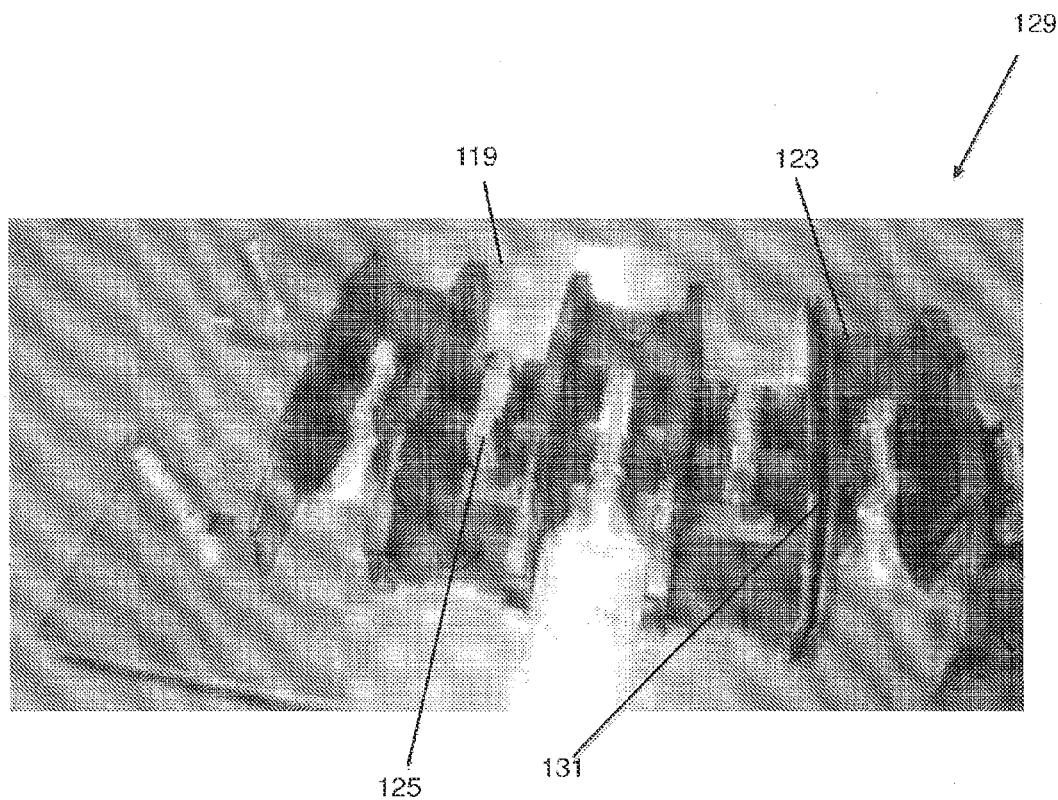
FIG. 4 is a three-dimensional view of a prior art load center bus assembly, wherein the bus assembly includes individual circuit separating insulators manually attached to bus bars.

Referring now to FIG. 4, a prior art multi-piece bus bar and insulation element assembly (129) is depicted. This prior art multi-piece assembly (129) may use individual branch insulators (123), which may be arranged side-by-side and can be removably attached to the bus bars (119). The use of individual branch insulators (123) can cause sizing inefficiencies, such as creation of physical gaps (131) between the branch insulators (123). In the prior art load multi-piece assembly (129), the bus bar stabs (125) are visible between the individual branch insulators (123).

Figure 5:
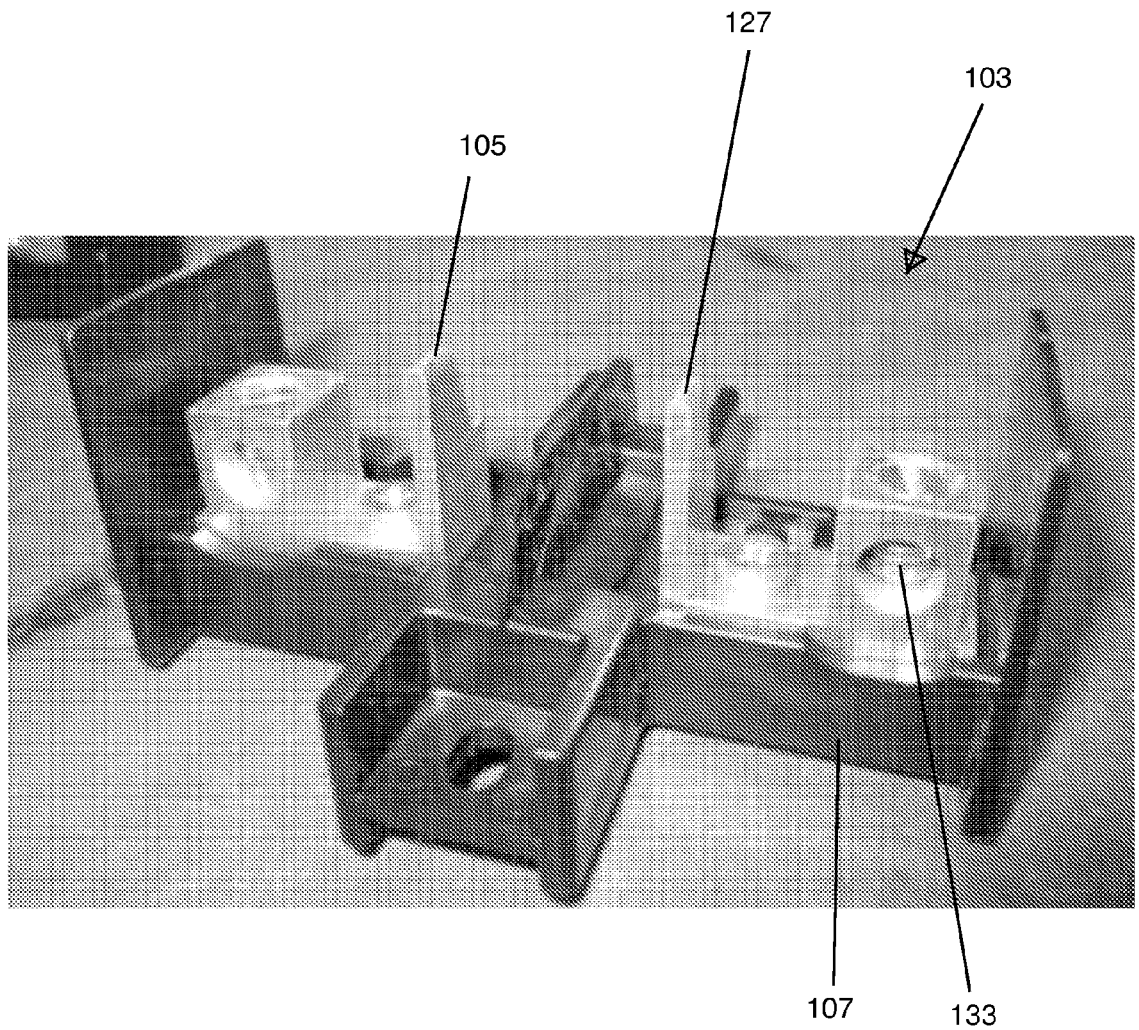
FIG. 5 is a three-dimensional view of another exemplary embodiment of a small scale insert-molded amalgamated bus assembly made in accordance with the present disclosure, including bus bars that are insert-molded into an insulating element.

Referring now to FIG. 5, another embodiment of the insert-molded bus assembly (103) made in accordance with the present disclosure is shown. The bus assembly of FIG. 5 (103) does not contain a separate backpan as shown in FIG. 1 (e.g., the back pan (109)). Rather, the embodiment of FIG. 5 uses an insert-molded insulation (107) that both provides electrical insulation of the bus elements (105) and anchors the load center. The bus assembly (103) may use bus bars (105) that have been insert-molded into the insert-molded insulation (107). The bus bars (105) in FIG. 5 include connection lugs (133) and bus stabs (127) that extend upwardly from the portion of the bus bar (105) that is insert-molded into the insulation (107).

In view of what is described above, one skilled in the art will understand that the embodiments of the insert-molded assembly thus far described comprise an electrical load center interior, said load center interior having a backpan assembly and a distribution bus assembly detachably or permanently fastened to the backpan, the distribution bus assembly comprising one or more bus elements and insulating elements, wherein the bus elements are insert-molded into the insulating elements, forming an amalgamated distribution bus assembly.

According to several embodiments, the present disclosure simplifies the manufacture, assembly, arrangement, installation, and use of electrical load centers while sufficiently protecting load centers from arcing and short circuit events. The foregoing advantages are attained through the use of insert-molding technology in conjunction with the precise arrangement and placement of bus elements within a mold for insulation to create an amalgamated distribution bus assembly, detachably or permanently fastenable to a load center interior backpan. These advantageous characteristics of the insert-molded distribution bus assembly result in substantial time saving during the manufacture, assembly, installation and use of electrical load centers. Additionally, the advantages no longer require users or technicians to have specialized skills necessary for the assembly and installation of the bus assembly into the load center.

What has been shown is an insert-molded distribution bus assembly for an electrical load center. While the insert-molded bus assembly has been described through specific embodiments and applications thereof, it is understood that numerous modifications and variations could be made thereto by those skilled in the art without departing from the spirit and scope of the disclosure. It is therefore understood that within the scope of the claims, the disclosure may be practiced otherwise than specifically described herein.

Accordingly, it is to be understood that the inventive concept is not to be limited by the specific illustrated embodiments, but only by the scope of the appended claims. The description may provide examples of similar features as are recited in the claims, but it should not be assumed that such similar features are identical to those in the claims unless such identity is essential to comprehend the scope of the claim. In some instances, the intended distinction between claim features and description features is underscored by using slightly different terminology.

What is claimed is:

1. A load center electrical distribution bus assembly, comprising:
   one or more electrical distribution bus assembly components;
   one or more electrical distribution bus components, wherein the one or more electrical distribution bus components include an electrical distribution bus comprising at least one electrical distribution bus bar capable of conducting electrical current to the one or more electrical distribution bus components; and
   an insert-molded electrical insulation element in close proximity with the at least one electrical distribution bus bar, wherein the insulation element electrically insulates the at least one distribution bus bar from the one or more electrical distribution bus assembly components,
   wherein the electrical insulation element comprises insert-molded on-conducting material, and
   wherein the one or more electrical distribution bus components and the insert-molded electrical insulation element comprises a single amalgamated bus assembly.

2. The bus assembly according to claim 1, wherein the insert-molded electrical insulation element comprises thermoplastic material that is insert-molded into a mold cavity defining a desired shape of the insert-molded electrical insulation element.

3. The bus assembly according to claim 2, wherein the single amalgamated bus assembly has selected insulation properties and selected spacing, arrangement and positioning of the electrical distribution bus components.

4. The bus assembly according to claim 3, wherein the one or more electrical distribution bus assembly components include a backpan detachably or permanently fastened to the amalgamated bus assembly.

5. The bus assembly according to claim 4, wherein the insert-molded insulation element electrically insulates the backpan from the one or more electrical distribution bus components.

6. The bus assembly of claim 1, wherein the at least one bus bar includes one or more bus bar stabs adapted to be coupled to one or more branch circuit breakers, and wherein the one or more bus bar stabs are capable of conducting electricity to the one or more branch circuit breakers.

7. The bus assembly of claim 6, wherein the at least one bus bar comprises a substantially flat and elongated electrically conductive material, and wherein the one or more bus stabs protrude away from the at least one bus bar toward a midline defined in the electrical insulation element.

8. The bus assembly of claim 1, wherein the at least one bus bar is electrically coupled to a main circuit breaker and to one or more branch circuit breakers.

9. The bus assembly of claim 7, wherein the at least one bus bar includes a relatively thin layer of insulation material insert-molded onto the substantially flat and elongated conductive material during an insert-molding process.

10. The bus assembly according to claim 1, wherein the electrical insulation element includes one or more branch breaker compartments, wherein the branch breaker compartments are adapted to accommodate one or more branch circuit breakers, and wherein the compartments electrically insulate the one or more branch circuit breakers from each other.

11. The bus assembly according to claim 10, wherein the one or more branch breaker compartments are defined by substantially parallel walls extending perpendicularly from the at least one bus bar.

12. The bus assembly according to claim 11, wherein the one or more branch breaker compartments include an insulation stab, and wherein the insulation stab provides support for the one or more branch circuit breakers, and wherein the insulation stab prevents damage to the at least one bus bar when the one or more branch circuit breakers are coupled to the electrical distribution bus assembly.

13. The bus assembly according to claim 1, wherein the one or more electrical distribution bus components include at least two electrical distribution bus bars, and wherein the insulation element provides electrical insulation between the at least two bus bars, and wherein the electrical insulation prevents electrical arcing, overcurrent and short circuits from occurring within the bus assembly.

14. The bus assembly according to claim 2, wherein the one or more electrical distribution bus components include at least two electrical distribution bus bars, and wherein the insulation element comprises a single amalgamated bus assembly having selected electrical insulation properties and selected spacing, arrangement and positioning of the at least two bus bars with relation to each other.

15. The bus assembly according to claim 4, wherein the backpan comprises conductive material, and wherein the insert-molded insulation element provides selected physical spacing between the backpan and the one or more electrical distribution bus components, where the selected physical spacing is sufficient to electrically insulate the backpan from the bus components.

16. The bus assembly according to claim 8, wherein the main circuit breaker is coupled to an external power supply.

17. The bus assembly according to claim 4, wherein the backpan comprises non-conductive material.

18. An amalgamated bus assembly, comprising:
one or more electrical distribution bus components, wherein the one or more electrical distribution bus components include an electrical distribution bus comprising at least two electrical distribution bus bars capable of conducting electrical current to the one or more electrical distribution bus components; and
an insert-molded electrical insulation element in close proximity with the at least two bus bars, wherein the insulation element electrically insulates the at least two bus bars from each other, and
wherein the electrical insulation element comprises insert-molded thermoplastic material that is insertmolded into a mold cavity defining a desired shape of the insert-molded electrical insulation element, and
wherein the one or more electrical distribution bus components and the insert-molded electrical insulation element comprises a single amalgamated bus assembly.

\* \* \* \* \*